C. W. BALL.
Vehicle-Axle.
No. 219,432.  Patented Sept. 9, 1879.
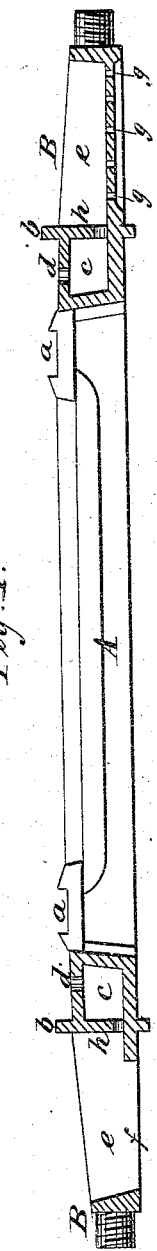
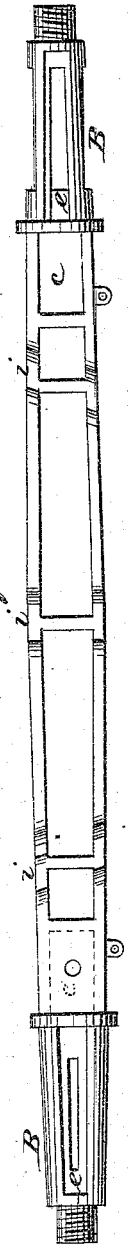
WITNESSES:
Achilles Sehehl.
C. Sedgwick.
INVENTOR:
C. W. Ball
BY Munn & Co
ATTORNEYS.

UNITED STATES PATENT OFFICE.

CHARLES W. BALL, OF MACON, ILLINOIS.

IMPROVEMENT IN VEHICLE-AXLES.

Specification forming part of Letters Patent No. 219,432, dated September 9, 1879; application filed July 18, 1879.

*To all whom it may concern:*

Be it known that I, CHARLES W. BALL, of Macon, in the county of Macon and State of Illinois, have invented a new and Improved Axle, of which the following is a specification.

My invention relates to improvements in axles for carriages, wagons, and other vehicles; and it has for its object to more uniformly and efficiently lubricate the spindles, and to obtain a more perfect adjustment of the running-gear.

The invention consists in a vehicle-axle which has an oil-reservoir and in its spindle a recess separated by an apertured partition from the reservoir, so that the recess may be filled with packing that cannot work into and wrap around the spindle.

In the accompanying drawings, Figure 1 is a side view of the axle with the spindles in section. Fig. 2 is a top view of the axle. Figs. 3 and 4 are similar views of a modified form of the axle.

Similar letters of reference indicate corresponding parts.

Referring to the drawings, A is the axle-tree, and B B are the spindles, both cast in one homogeneous piece of metal. On the upper side of the axle-tree, at each end, are recesses $a$ $a$, forming beds for the springs. Between the beds and the collars $b$ are recesses $c$, provided with covers, thus forming boxes for packing and the lubricant. In the cover is a hole, $d$, for pouring the lubricant through into the box.

In the spindles are recesses $e$, nearly as long as the spindles. The bottoms of these recesses have openings through them, either in the form of a long narrow slit, $f$, or perforations $g$, as shown in Figs. 1 and 2. These recesses are divided from the lubricating-boxes by partitions $h$, with one or more perforations leading through them, to permit the lubricant to flow through freely to the recess.

The recess in the spindle is designed to be filled with packing, or any suitable grease, tallow, or tar, in addition to the oil chambers or boxes $c$. These are filled with packing and supplied with oil passed through the opening in the cover, from whence it flows through the partition to the recess in the spindle, and thence it is fed to the spindle.

A simple and economical axle is thus formed by making the axle-tree and spindle in one, the cost is greatly lessened, and, in addition, a truer adjustment of the running-gear is obtained than is possible where the tree and spindle are made separately. The lubricating arrangements, too, are more simple and efficient than those now employed.

The axle shown in Figs. 1 and 2 is more especially intended for light road-wagons using platform-springs. For common farm-wagons I propose to use that form shown in Figs. 3 and 4, wherein the center of the axle-tree is made hollow. There are recesses $i$ $i$ $i$ for the reach and hounds of the wagon; but otherwise this form of axle is made the same as that first described, having recesses in the spindles, lubricating-boxes, and separating-partitions for the lubricant to flow through.

I am aware that it is not new to make axles in one piece with their spindles, or with seats for the springs; but

What I claim, and desire to secure by Letters Patent, is—

A vehicle-axle provided with an oil-reservoir, $c$, between the spring-seat $a$ and the collar $b$, and a spindle, B, bottom-slitted, and having recess $e$, separated by an apertured partition, $h$, from said reservoir, as shown and described.

CHARLES WESLEY BALL.

Witnesses:
 THOMAS C. DINKALL,
 JAMES W. STURGIS.